United States Patent Office 3,277,914
Patented Oct. 11, 1966

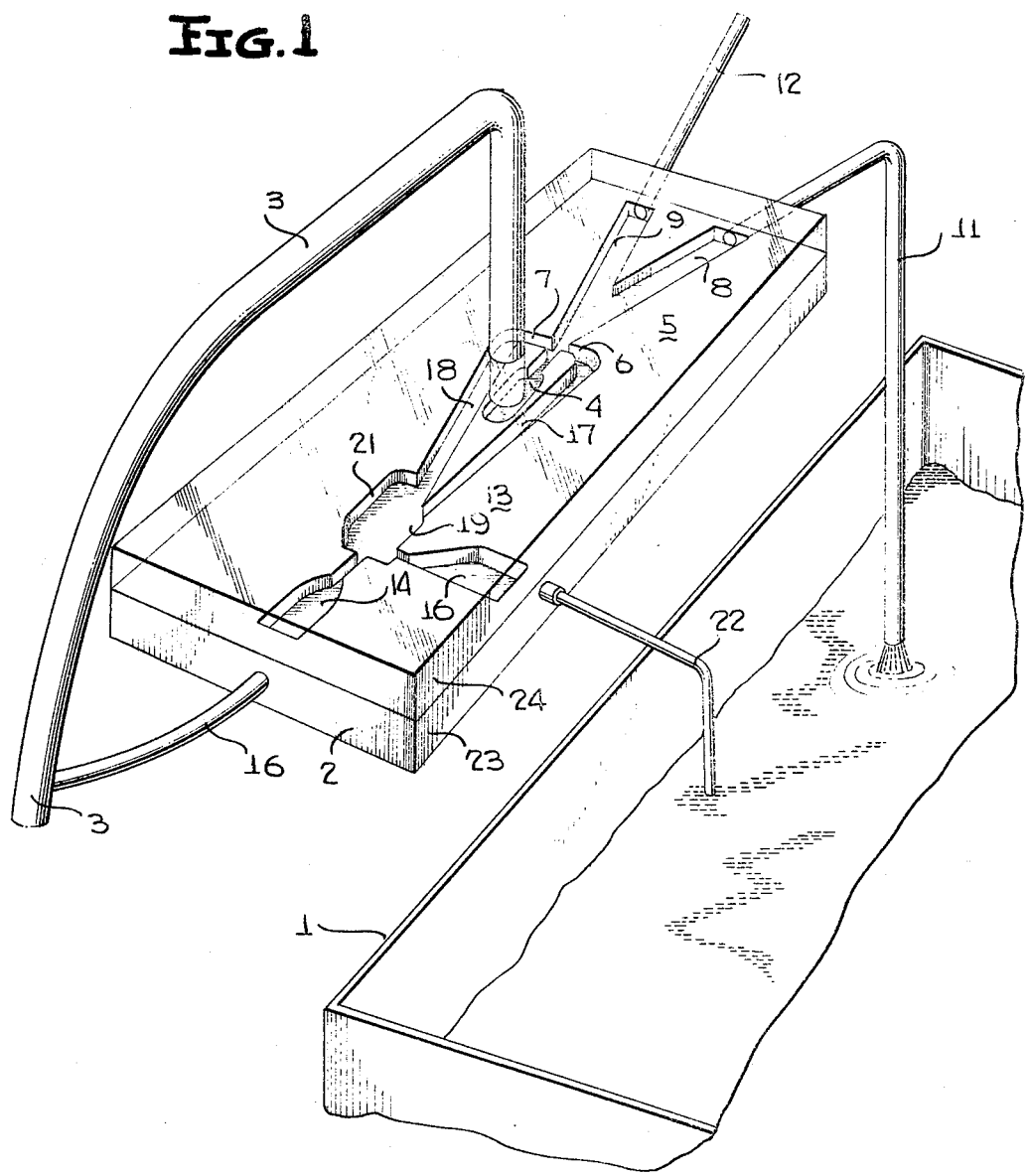

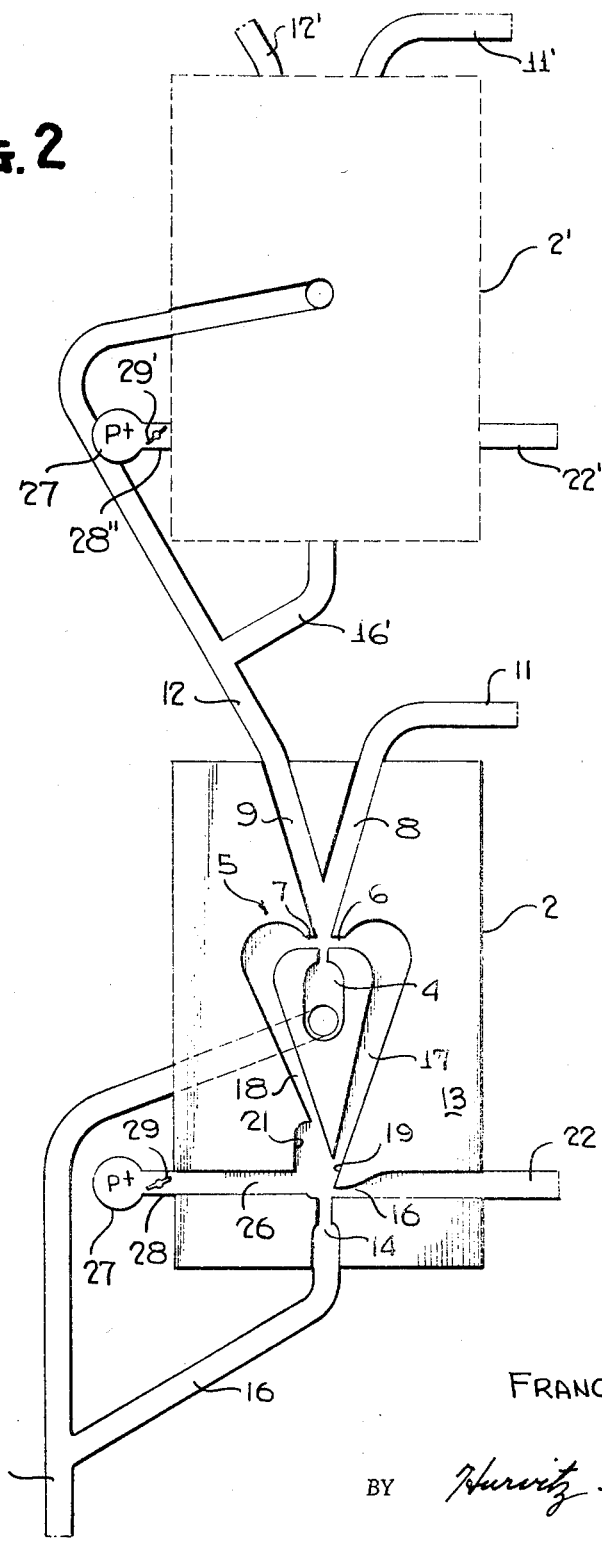

3,277,914
AUTOMATIC FILL VALVE
Francis M. Manion, Rockville, Md., assignor to Bowles Engineering Corporation, Silver Spring, Md., a corporation of Maryland
Filed Dec. 12, 1963, Ser. No. 330,099
11 Claims. (Cl. 137—81.5)

The present invention relates to valves and, more particularly, to an automatic liquid fill valve having no moving parts employed to fill a container to a prescribed height or level of liquid and thereafter terminate the filling process.

Presently available industrial automatic liquid fill valves leave much to be desired in the way of cost and reliability. Electronically controlled automatic fill valves are exepnsive. Float control valves depend upon complicated linkages requiring continual adjustment for precise operation.

In accordance with the present invention, there is provided an automatic liquid fill valve; that is, a valve apparatus for controlling the filling of a tank or receptacle to a prescribed level, which valve employs no mechanical moving parts and which does not employ electronic or other expensive techniques. The automatic liquid fill valve of the present invention includes only two elements, a fluid diverter valve and a sensor element. The diverter valve is basically a pure fluid flip-flop for delivering liquid supplied thereto either to a pipe positioned to supply the liquid to a container or to a liquid by-pass pipe. The by-pass pipe delivers the liquid either to a sump of the pump or to a further diverter valve for a second fill valve for supplying liquid to a second tank. The sensor element is an asymmetrical pure fluid flip-flop supplied preferably with a small quantity of the liquid being handled by the system. A level sensor tube extends into the container being filled and terminates a distance from the top of the container corresponding to the desired fill height. When the liquid in the container is below the desired fill height, the liquid supplied to the sensor element is directed to a a control nozzle or channel of the diverter valve to cause the fluid to be directed to the container. When the fluid in the tank rises to cover the end of the level sensor tube, the fluid supplied to the level sensor element is diverted to a second control nozzle of the diverter valve and causes the fluid to be switched to the by-pass tube. The fluid employed or directed to the sensor element upon exiting from one or the other of the control nozzles of the diverter valve is recombined with the main stream and is therefore diverted either to the container or to the by-pass valve so that none of the liquid supplied to the automatic liquid level valve is lost in the process.

The by-pass tube, as previously indicated may be connected to one or more further automatic liquid fill valves for filling one or more further tanks. In such a construction it may be desired to wholly or partially by-pass one or more tanks and in accordance with a further feature of the present invention a manual control is provided in each valve mechanism for such purpose.

It is an object of the present invention to provide an automatic liquid fill valve which employs no moving parts and which fills a tank with fluid to a precise level.

It is another object of the present invention to provide an automatic liquid fill valve employing only two pure fluid flip-flop elements which are inexpensive to manufacture and do not employ any mechanical moving parts.

Another object of the present invention is to provide an inexpensive pure fluid automatic liquid fill valve capable of controlling the filling of a container to a precise level.

Yet another object of the present invention is to provide automatic liquid fill valves for selectively filling a plurality of tanks or containers which in the absence of an overriding control fill the tanks in sequence and which may be commanded to follow a different sequence of filling or to only partially fill one or more of the tanks.

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a perspective view of the automatic fill valve of the present invention; and FIGURE 2 is a flow diagram of a system employing the valves of the present invention for filling in tandem at least two containers.

Referring specifically to FIGURE 1 of the accompanying drawings, there is illustrated a container 1 adapted to be filled with liquid to a prescribed level and an automatic fill level valve generally designated by the reference numeral 2. Liquid which is to be supplied to the container 1 is supplied through a pipe 3 to a power nozzle 4 of a fluid diverter valve generally designated by the reference numeral 5. The diverter valve 5 comprises in addition to the power nozzle 4, a pair of control nozzles 6 and 7 and a pair of fluid output channels 8 and 9. The channel 8 is connected to a filler tube or pipe 11 which receives fluid from the channel 8 and supplies fluid to the container 1. The output passage 9 of the diverter valve 5 is connected to supply liquid to a by-pass tube 12 adapted to carry the fluid diverted thereto to a second automatic fill valve or to the sump of the pump supplying the pressurized fluid to the system.

The diverter valve 5 is controlled by a sensor element 13 which is an asymmetrical pure fluid flip-flop. The sensor element 13 comprises a power nozzle 14 supplied with liquid by means of the tube 16 which diverts a small portion of the liquid in the pipe 3 to the power nozzle 14. The senor element 13 is provided with a single control nozzle 16 and a pair of output passages 17 and 18. Output passages 17 and 18 are connected to control nozzles 6 and 7, respectively of the diverter valve 2.

The element 13 is asymmetrical in that the two sidewalls of the element are displaced at different distances from the centerline of the power nozzle 14. More specifically, a right sidewall 19 is located closer to the centerline of the orifice 14 than is a left sidewall 21. Further asymmetry is provided by the location of a flow divider 20 located between output passages 17 and 18. The divider 20 is located to the right (see FIGURE 2) of the centerline of the power nozzle 14 so that fluid issued by the nozzle 14, when undeflected, flows primarily to the passage 18.

The nozzle 16 is connected to a level sensor pipe 22 which terminates in the tank 1 at a level below the top of the tank at which filling is to be terminated. So long as the end of the pipe 22 is not contacted by liquid; that is, terminates in an air or other gaseous atmosphere, sufficient fluid is drawn through the pipe 22 and the nozzle 16 into the element 13 to at least partially reduce the boundary layer effect between the main nozzle and the wall 19. The boundary layer effects developed between the main stream issuing from the nozzle 14 and the sidewall 21 is sufficiently great that in the presence of flow of air through the nozzle 16, the power stream is diverted to the output channel 18. This effect is enhanced by the placement of the divider 20. Upon the end of the tube 22 being covered with liquid, the flow of air to the power nozzle 16 is blocked and the boundary layer effects between the main power stream issuing from the nozzle 14 and the sidewall 19 are sufficient to cause the stream to switch back to the right, attach to the sidewall 19 and be directed out through the output passage 17.

In operation, assuming initially that the container 1 is empty and that liquid is supplied to the pipe or tube 3, a portion of the liquid is diverted by tube 16 and is directed through the power nozzle 14. The liquid issued by nozzle 14 attaches to the sidewall 21 and is directed to the output passage 18 and thence to the control nozzle 7. The liquid which continues in the tube 3 is applied to the power nozzle 4 of the diverter valve 5 and is directed to the output passage 8 due to the presence of the liquid issuing from the control nozzle 7. Thus, the fluid in the line 3 is directed to the filler tube 11 and is supplied to the tank 1. It will be noted that the small proportion of fluid diverted by the pipe 16 to the sensor element 13 recombines with the main flow through the pipe 3 in the diverter valve 5 and flows with the main stream to the passage 8.

Liquid continues to be supplied to the container 1 until the liquid rises sufficiently in the container 1 to block the end of the tube 22. Entrainment air is no longer supplied to the unit 13 through the nozzle 16 so that the liquid issuing from the power nozzle 14 now attaches to the side wall 19 and flows to the output channel 17. Fluid flowing through the output channel 17 passes through the control nozzle 6 of the diverter valve 5 and switches the main power stream issuing from the power nozzle 4 to the output channel 9. The fluid in the channel 9 as previously indicated is supplied to the pipe 12 and is directed away from the tank 1. Again, the fluid flowing through the unit 13 and out through the power nozzle 6 of the diverter valve 5 combines with the main stream issuing from the power nozzle 4 so that all of the fluid in the system is directed to the by-pass tube 12 and none of the liquid; that is, even that portion of the fluid employed in the sensor element 13, is lost to the system.

It will be noted that the system may be constructed to automatically fill one tank and then a second tank in a line and a third and a fourth and so on if so desired. More specifically, if the container 1 is the first container in a string; that is, is a container having the furthest upstream location relative to flow through the system, the container 1 is the first container to be filled since all of the fluid supplied to the system through the pipe 3 is initially diverted by the diverter valve 5 to the container 1. As soon as the container 1 is filled, the fluid in the pipe 3 is now diverted to the pipe 12 and thence to a second automatic fill valve of the system. When the tank associated with the second automatic fill valve is filled, then the fluid is diverted to the third valve in the tandem arrangement and thence through the system. When all tanks are filled, the fluid may be automatically recirculated to the sump of the pump of the system.

Referring now specifically to FIGURE 2 of the accompanying drawings, there is provided a schematic drawing of an automatic fill system for controlling the supply of fluid to at least two tanks, the tanks not being illustrated in this figure. Elements illustrated in FIGURE 2 which correspond to elements illustrated in FIGURE 1, bear the same reference numerals. In FIGURE 2, a second automatic liquid fill valve 2' is provided being designated simply by a dashed-line enclosure since, in all respects, it corresponds with the elements enclosed within the dashed-line box 2 designating the automatic liquid fill valve of FIGURE 1. The by-pass tube 12 from the unit 2 supplies fluid to the unit 2', a branch pipe 16' being employed to supply fluid to the sensor element of the second valve.

It is seen that upon fluid initially being supplied to the pipe or conduit 3 with the tank associated with the pipe 22 being empty, fluid is directed to the fill pipe 11 of the unit 2. When the container has been filled to the proper height, the tube 22 is blocked, fluid in the reverse unit switches to the output passage 17 and the fluid from the unit 5 is diverted to the pipe 12 and is supplied to the second automatic liquid fill valve 2'. The automatic liquid fill valve 2' starts to fill its associated tank and when this tank is filled the fluid is diverted from the fill pipe 11' to the by-pass pipe 12'.

This system is wholly satisfactory and automatic tandem filling of the tanks is achieved. However, in a multiple tank arrangement, it may be desired to only partially fill each of a plurality of tanks if an amount of fluid is to be received which does not require filling of all tanks. This would be particularly true aboard vehicles, particularly sea and air vehicles where a balanced load is desired. Alternatively, it may be desired to completely by-pass a tank if a leak has been discovered therein or if for some reason, it is desired to shut the tank down and clean it or to perform some other maintenance operation thereon. In order to achieve this result, each of the sensor units 13, 13', etc., is provided with a second control nozzle 26 connected to a suitable source of pressure 27. The nozzle 26 is connected to the source 27 via a passage 28 having a flapper or butterfly valve 29 disposed therein. The pressure of the source 27 is such that when the flapper valve 29 is open the fluid issued by the power nozzle 14 is diverted to the output channel 17, regardless of the condition of the pipe 22. Consequently, fluid supplied to the diverter valve 5 through the pipe 3 is directed to its by-pass channel 12.

When the flapper valve 29 is closed the device operates in substantially the same manner as previously described. The flapper valve 29 should be maintained relatively close to the unit 13; that is, to the control nozzle 26, so that no entrainment fluid is supplied to the unit when the flapper valve 29 is closed.

The automatic liquid fill valve 2' is also provided with a similar control arrangement, a second control nozzle being connected to a source of pressurized fluid 27' via a channel 28' having a flapper valve 29' disposed therein. Thus, by merely closing any one of the flapper valves 29, 29', etc., a particular tank may be by-passed or the tank may be partially filled by initially closing a valve 29, 29', etc., and opening it after some desired fill level has been achieved.

The construction of the automatic fill valve of the present invention is quite simple and in smaller installations may constitute two plates, namely, a lower plate 23 as viewed in FIGURE 1 and an upper plate 24, the upper plate being illustrated as being made of transparent material so that the construction of the device may be readily seen. The various elements of the diverter valve 5 and sensor element 13 are formed as channels, passages, nozzles, orifices, etc., cut in the lower plate 23. The upper plate 24 is placed in sealing arrangement over the top of the plate 23 so as to seal the various passages, channels, etc., to prevent leakage between these various recesses in the plate 23.

The pipes 16, 22, 11 and 12 communicate with various elements through apertures drilled in the base plate 23, the connection being made through suitable couplings which are well known in the art and are of no import in the present invention. The main flow tube 3 communicates with the power nozzle 4 through a vertical orifice, as viewed in FIGURE 1, drilled in the plate 24 or alternatively, the connection may be made by drilling a vertical orifice through the plate 23. Either method is equally acceptable. Thus, the automatic fill level valve is a wholly contained unit which is only as big as is required to handle the fluid flow of the system. It is readily apparent that if the quantities of fluid to be handled are very large, the method of fabrication illustrated in the figure would not be employed and that molded or machine drilled and milled metal elements could be employed in place of the type of element illustrated.

FIGURE 2 illustrates series connected units. It is apparent that a parallel connection of units may be employed, this not being illustrated since the arrangement required is completely obvious. It suffices to say that a main supply pipe must be provided having a capacity sufficient to supply the maximum number of parallel units to be supplied concurrently; that is, the maximum number of chambers to be filled at the same time.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. An automatic liquid fill valve comprising a fluid flip-flop diverter valve having a power nozzle, at least one control nozzle and a pair of output channels, means adapted to supply liquid in one of said output channels to a container, a liquid level sensor element comprising an asymmetrical fluid flip-flop having a power nozzle at least one control nozzle and a pair of output passages, a tube connected to said control nozzle for supplying entrainment fluid thereto, said asymmetrical fluid flip-flop having an asymmetry such that fluid is directed to one of said output passages upon entrainment fluid being supplied to said control nozzle of said asymmetrical flip-flop and fluid is directed to the other of said output passages in the absence of entrainment of fluid, and means connecting an output passage of said asymmetrical fluid flip-flop to said control nozzle of said diverter valve to direct fluid to said one of said output channels when entrainment fluid is supplied to said control nozzle of said asymmetrical fluid flip-flop.

2. An automatic liquid fill valve comprising a fluid flip-flop diverter valve having a power nozzle, at least one control nozzle and a pair of output channels, means adapted to supply liquid in one of said output channels to a container, a liquid level sensor element comprising a fluid flip-flop having a power nozzle at least one control nozzle and a pair of output passages, a tube connected to said control nozzle for supplying entrainment fluid thereto, means for directing fluid to one of said output passages upon entrainment fluid being supplied to said control nozzle of said sensor element, and for directing fluid to the other of said output passages in the absence of entrainment fluid, and means connecting an output passage of said fluid flip-flop of said sensor element to said control nozzle of said diverter valve to direct fluid to said one of said output channels when entrainment fluid is supplied to said control nozzle of said sensor element and means responsive to flow of fluid to the other of said output passages of said fluid flip-flop of said sensor element to direct fluid to the other of said output passages of said diverter valve.

3. The combination according to claim 2 wherein said second-mentioned means is asymmetry of said flip-flop of said sensor element.

4. An automatic fill valve system comprising a plurality of automatic liquid fill valves of claim 2, and further comprising means for connecting the other of said output channels of one of said automatic liquid fill valves to power nozzles of another of said automatic liquid fill valves.

5. The combination according to claim 4 wherein said flip-flops of said sensor elements each have a second control nozzle disposed on an opposite side of said power nozzle of said first-mentioned control nozzle, and means for selectively supplying pressurized fluid to selected ones of said second control nozzles to override signals developed by said first-mentioned control nozzle.

6. An automatic liquid fill valve comprising a fluid flip-flop diverter valve having a power nozzle, a pair of control nozzles disposed on opposite sides of said power nozzle, and a pair of output channels, means adapted to supply liquid in one of said output channels to a container, a liquid level sensor element comprising an asymmetrical fluid flip-flop having a power nozzle, at least one control nozzle and a pair of output passages, a tube connected to said control nozzle for supplying entrainment fluid thereto, said asymmetrical fluid flip-flop having an asymmetry such that fluid is directed to one of said output passages upon entrainment fluid being supplied to said control nozzle of said asymmetrical flip-flop and fluid is directed to the other of said output passages in the absence of entrainment fluid, and means connecting an output passage of said asymmetrical fluid flip-flop to one of said control nozzles of said diverter valve to direct fluid to said one of said output channels when entrainment fluid is supplied to said control nozzles of said asymmetrical fluid flip-flop and to the other of said output channels in the absence of said entrainment fluid.

7. The combination according to claim 1 wherein said sensor tube extends into said container to such an extent that an end thereof remote from said control nozzle of said asymmetrical flip-flop may be covered by fluid in said container.

8. An automatic liquid fill valve comprising a fluid flip-flop diverter valve having a power nozzle, at least one control nozzle and a pair of output channels, means adapted to supply liquid in one of said output channels to a predetermined region, a liquid level sensor element comprising an asymmetrical fluid flip-flop having a power nozzle, at least one control nozzle and a pair of output passages, a tube connected to said control nozzle for supplying entrainment fluid thereto, said asymmetrical fluid flip-flop having an asymmetry such that fluid is directed to one of said output passages upon entrainment fluid being supplied to said control nozzle of said asymmetrical flip-flop and fluid is directed to the other of said output passages in the absence of entrainment of fluid, and means connecting an output passage of said asymmetrical flip-flop to said control nozzle of said diverter valve to direct fluid to said one of said output channels when entrainment fluid is supplied to said control nozzle of said asymmetrical fluid flip-flop.

9. An automatic liquid fill valve comprising a fluid flip-flop diverter valve having a power nozzle, a pair of control nozzles disposed on opposite sides of said power nozzle, and a pair of output channels, means adapted to supply liquid in one of said output channels to a predetermined region, a liquid level sensor element comprising a further fluid flip-flop having a power nozzle, at least one control nozzle and a pair of output passages, a tube connected to said control nozzle of said further fluid flip-flop for supplying entrainment fluid thereto, means for biasing fluid issued by said power nozzle of said further fluid flip-flop such that fluid is directed to one of said output passages upon entrainment fluid being supplied to said control nozzle of said further flip-flop and fluid is directed to the other of said output passages in the absence of entrainment fluid, and means connecting an output passage of said further fluid flip-flop to one of said control nozzles of said diverter valve to direct fluid to said one of said output channels when entrainment fluid is supplied to said control nozzles of said further fluid flip-flop and to the other of said output channels in the absence of said entrainment fluid.

10. The combination according to claim 9 wherein said further fluid flip-flop includes a second control nozzle disposed on an opposite side of said power nozzle from said at least one control nozzle, and means for selectively supplying pressurized fluid to said second control nozzle to override signals developed by said at least one control nozzle.

11. The combination according to claim 9 wherein said predetermined region comprises a container and wherein said tube extends into said container to such an extent that an end thereof remote from its associated control nozzle may be covered by fluid in said container.

References Cited by the Examiner

UNITED STATES PATENTS 3,171,421  3/1965  Joesting _____ 137—81.5

FOREIGN PATENTS 1,278,782  11/1961  France.

M. CARY NELSON, *Primary Examiner.*

W. CLINE, *Assistant Examiner.*